United States Patent [19]

Gray et al.

[11] Patent Number: 5,123,277
[45] Date of Patent: Jun. 23, 1992

[54] APPARATUS AND METHOD FOR ANALYZING GAS DRYER PERFORMANCE

[75] Inventors: Robert F. Gray, Winter Springs; Maurice A. Jenkins, Casselberry; Ali Moradian, Lake Mary; Edward D. Thompson, Casselberry; Peter L. Wilheim, Winter Springs, all of Fla.

[73] Assignee: Westinghouse Electric Corp., Pittsburgh, Pa.

[21] Appl. No.: 532,833

[22] Filed: Jun. 4, 1990

[51] Int. Cl.⁵ ............................................. F26B 17/14
[52] U.S. Cl. ................................. 73/29.01; 73/19.01; 34/80
[58] Field of Search ................. 73/19.01, 29.01; 34/80; 252/194, 212, 217

[56] References Cited

U.S. PATENT DOCUMENTS

| | | | |
|---|---|---|---|
| 2,434,419 | 1/1948 | Laughlin et al. | 34/80 |
| 4,570,360 | 2/1986 | Nakagomi | 34/80 |
| 4,601,114 | 7/1986 | Noguchi | 34/80 |
| 4,918,837 | 4/1990 | Graff | 34/80 |

Primary Examiner—Hezron E. Williams
Assistant Examiner—Craig Miller

[57] ABSTRACT

An apparatus and method are provided for using logic to analyze the performance of a gas dryer system having dual dryer towers charged with desiccant. The apparatus and method utilizes sensors to sense the moisture content of gas entering into, discharging from, and recirculating within the dryer and also utilizes a flow meter to sense the flow rate of moisture remove from the desiccant during the regeneration mode. The apparatus and method determine when the dryer towers should be switched between their adsorption and regeneration modes and detects sensor malfunctions, desiccant problems, and water leaks.

15 Claims, 8 Drawing Sheets

APPARATUS AND METHOD FOR ANALYZING GAS DRYER PERFORMANCE

BACKGROUND OF THE INVENTION

The invention concerns an apparatus and method for analyzing the performance of a gas dryer, such as that typically employed to remove moisture from the hydrogen used to cool electric generators.

Electric power is most commonly produced in a dynamo-electric machine, commonly referred to as a generator, driven by a steam turbine. The generator is comprised of a stationary outer casing surrounding a centrally disposed rotor. The stator contains the armature winding and the rotor the field winding. Operation of the generator produces considerable heat in the windings, the amount of heat produced being a function of the electric output of the generator. This heat must be removed to avoid damaging the windings. Typically, the heat generated in the windings is removed by circulating a cooling fluid through passages in the stator and rotor. Although air may be used as the cooling fluid, hydrogen is preferred since its use results in reduced windage loss and its higher thermal conductivity provides greater heat transfer. The hydrogen is used in a closed loop cooling system. After passing through the stator and rotor, it is cooled in an indirect gas/water cooler and then recirculated back to the generator.

Moisture can enter the hydrogen system as a result of the leakage of cooling water in the gas/water cooler or the leakage of steam from the turbine driving the generator. Since moisture circulating through the generator along with the hydrogen can result in corrosion and electrical shorts and grounds, it is crucial that such moisture be removed. Consequently, a portion of the hydrogen gas flow is directed through a gas dryer. In the gas dryer, moisture removal is accomplished by directing the hydrogen through a dryer tower containing a desiccant, typically an aluminate. Since the adsorption capacity of the desiccant is limited, it must be periodically dried by heating. This drying process is often referred to as regeneration.

To avoid interrupting the moisture removal process while regeneration is being accomplished, the gas dryer contains two identical dryer towers, each charged with desiccants. While one dryer tower is on-line, referred to as the adsorption mode, the other tower is in its regeneration mode. Thus, continuity of moisture removal is accomplished by periodically and simultaneously switching each tower between the adsorption and regeneration modes. The period of time between each dryer tower switchover is referred to as a cycle.

Ideally, a tower should be switched from the adsorption to regeneration mode when its desiccant can no longer effectively remove moisture, provided the desiccant in the other tower has been sufficiently dried to enable it to perform adequately. Since the rate of moisture ingestion into the hydrogen varies, due to the vagaries of the aforementioned leakages, the length of each adsorption cycle should also vary. However, this was not the case under the prior art method. Although moisture sensors were placed at the inlet and outlet to the dryer to allow monitoring of dryer performance, the data provided by these instruments was not utilized for control purposes. Instead, dryer tower switching was performed at fixed intervals using a timer, regardless of whether the dryer tower in its adsorption cycle was capable of further moisture removal. Hence, it is desirable to provide a means for continuously analyzing dryer tower performance and automatically switching dryer towers between their adsorption and regeneration modes only when such is indicated by an analysis of the dryer performance.

Leakage of oil into the hydrogen is a common occurrence and results in oil contamination of the dessicant. Such contamination causes a loss in adsorption capacity. Hence, although the desiccant can withstand many adsorption/regeneration cycles, its life is not unlimited and replacement of the desiccant will eventually be required. Under the prior art method, it was impossible to determine whether an increase in moisture in the hydrogen, as indicated by the inlet and outlet moisture sensors, was due to increased water ingestion—for example, as a result of a large leak in the gas/water cooler—or degradation of the desiccant. Hence, it is desirable to provide a means for detecting the presence of substantial moisture in the hydrogen system which can also discriminate between a water leak and a drop in desiccant effectiveness.

As previously mentioned, moisture sensors are placed at the inlet and outlet to the dryer to allow the operator to monitor dryer performance. However, under the prior art method the operator could not determine, based on performance data alone, whether a high moisture reading was genuine or the result of a faulty sensor. False moisture readings result in unnecessary inspections of the equipment. Since on-line inspection of the dryer poses a risk of hydrogen gas explosion, such unnecessary inspections are to be avoided. Hence, it is desirable to provide a means for verifying moisture sensor readings using dryer performance data.

SUMMARY OF THE INVENTION

It is the primary object of the current invention to provide an apparatus and method for analyzing the performance of a gas dryer.

It is a further object of the invention to provide a means for analyzing the performance of a gas dryer with dual towers which can automatically initiate switching of such dryer towers between their adsorption and regeneration modes when such switching is most advantageously done.

It is still another object of the invention to provide means for sensing the performance of the gas dryer and detecting malfunctions in the sensor means. It is yet another object of the invention to provide means for determining when the desiccant in the dryer needs replacement.

These and other objects are accomplished in a gas dryer system with dual towers in which moisture removal is accomplished by flowing the gas through a desiccant maintained in each dryer tower. Four-way valves at the inlet and outlet to the dryer direct the entering gas through only one of the dryer towers. Thus, only one of the towers is in its adsorption mode at any one time. The inlet and outlet valves place the other tower in its regeneration mode by directing gas which had previously entered the dryer to recirculate through the tower. During regeneration, the recirculating gas carries away moisture driven off from the desiccant by heaters. The moisture thus carried away is condensed and drained from the dryer.

According to the current invention, sensors are employed to sense the moisture content of the gas entering into, discharging from, and recirculating within the dryer. A flow meter is also used to sense the flow of water removed from the dryer tower in its regeneration mode.

A microcomputer-based performance analyzer receives data from these sensors and, using logic programmed into it, compares the dryer performance sensed by the sensors to the expected performance characteristics of the dryer. Based on this analysis, the performance analyzer automatically initiates switching of the dryer towers between their adsorption and regeneration modes when the desiccant in the tower operating in its adsorption mode becomes saturated and can no longer adsorb moisture, provided that regeneration has been completed in the tower in its regeneration mode.

According to the invention, the performance analyzer also detects malfunctions in the sensors, degradation of the desiccant and the presence of water leaks in the hydrogen system. Detection of these conditions causes the performance analyzer to initiate an alarm, thereby alerting the operator to the condition.

DESCRIPTION OF THE PREFERRED EMBODIMENT

Figure 1:
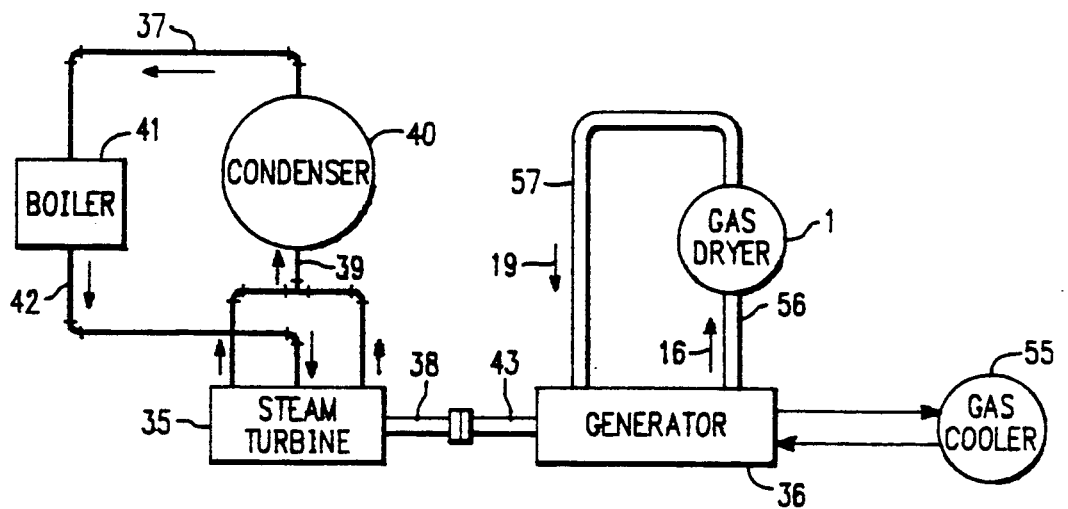
FIG. 1 is a schematic representation of a portion of a steam turbine power plant.

There is shown in FIG. 1 a schematic representation of a steam turbine power plant. The power plant is comprised of a boiler 41, a steam turbine 35, a condenser 40 and a generator system. The generator system is comprised of a generator 36, a gas cooler 55 and a gas dryer 1.

High pressure steam 42 is generated in a boiler 41 and supplied to the steam turbine 36. Low pressure steam 39 is discharged from the steam turbine and liquified in the condenser 40. The condensate 37 enters the boiler where it is turned to steam again in a continuous cycle.

The expansion of the steam in the steam turbine produces power to drive steam turbine output shaft 38. This output shaft drives shaft 43 of a generator 36, causing the generator rotor (not shown) to rotate within the stator (not shown) thereby generating electrical power.

As previously discussed, a gas, typically hydrogen, is circulated through the generator to cool the rotor and stator. This gas is circulated through the cooler 55 to dissipate the heat it absorbed from the generator. In addition, a portion 16 of the gas is directed to a gas dryer 1 so that moisture can be removed from the gas. The gas is received by the dryer via conduit 56. After drying, the gas 19 is discharged to the generator via conduit 57.

Figure 2:
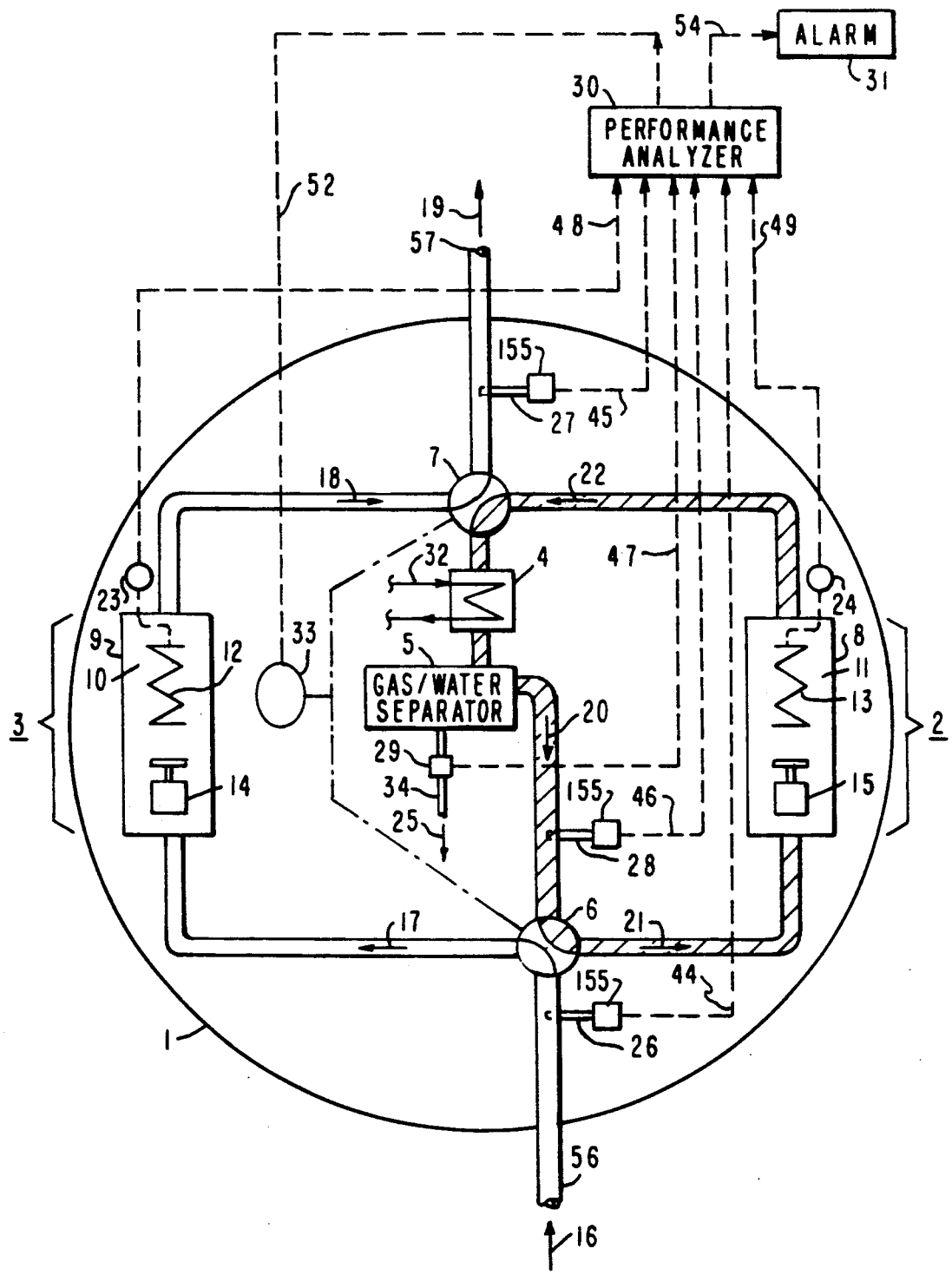
FIG. 2 is a schematic representation of the gas dryer system.

There is shown in FIG. 2 a hydrogen gas dryer 1. The primary components of the gas dryer are the dryer towers 2, 3, the cooler 4, the gas/water separator 5, and the inlet and outlet four-way valves 6, 7, respectively. Each dryer tower is comprised of a vessel 8, 9 containing desiccant 10, 11 (which may be an activated alumina powder), an electric heater 12, 13 and a blower 14, 15. The cooler 4 is supplied with cooling water 32, which may be condensate from the turbine steam system.

Drying is achieved by causing the hydrogen to flow through the desiccant 10, 11. The desiccant adsorbs moisture, thereby removing it from the hydrogen. Since the ability of the desiccant to adsorb moisture is limited, it must be periodically removed from service and dried. This drying process, referred to as regeneration, renews the moisture adsorbing capacity of the desiccant. In order to maintain continuity of dryer operation, the dryer cycles each tower between its adsorption and regeneration modes. Thus, while one dryer tower is on-line and adsorbing moisture (referred to as the adsorption mode) the other dryer tower is off-line having its desiccant dried (referred to as the regeneration mode).

There are two flow paths in the dryer, one through dryer tower 2 and the other through dryer tower 3. At any given time, one of these flow paths is a "through" flow path and the other is a recirculating flow path. Inlet and outlet four-way valves 6 and 7 each have two settings. When the valves are in their first setting, as shown in FIG. 2, they direct the flow of hydrogen entering the dryer through dryer tower 3 and recirculate hydrogen which had previously entered the dryer through dryer tower 2 (in FIG. 2 the recirculating hydrogen is denoted by cross-hatching). When the valves are in their second setting, the relationship of the dryer towers is reversed—entering hydrogen flows through dryer tower 2 and hydrogen recirculates through dryer tower 3. The tower through which the entering hydrogen flows is in its adsorption mode and the tower in which the hydrogen recirculates is in its regeneration mode.

As shown in FIG. 2, dryer tower 3 is in its adsorption mode (i.e., it is on-line and adsorbing moisture from the hydrogen), whereas dryer tower 2 is in its regeneration mode (i.e., previously adsorbed moisture is being driven off). A portion of the hydrogen circulating in the generator is discharged from the generator after removing heat from the generator components. This hydrogen 16 enters the gas dryer through inlet four-way valve 6. Valve 6 directs the hydrogen 17 to the flow path through dryer tower 3. Blower 14 promotes the flow of the hydrogen through the tower. In the tower, the hydrogen flows through the desiccant 10, which removes moisture from the gas by adsorption. The dry hydrogen 18 that is discharged from the dryer tower enters outlet four-way valve 7, which directs the hydrogen 19 back to the generator where it is cooled prior to being recirculated through the stator and rotor.

As shown in FIG. 2, valves 6 and 7 are set so that hydrogen 20, 21, 22 which has previously entered the dryer is recirculated by blower 15 through dryer tower 2, cooler 4 and gas/water separator 5. During the regeneration cycle, heater 13, which may be of the electric resistance type, raises the temperature of the desiccant 11, thereby driving off the previously adsorbed moisture. To insure complete drying of the desiccant during regeneration, the desiccant should be heated to 80°-105° C. Thermostats 23, 24 control the heaters 12, 13 so as to maintain a desiccant temperature in this range during drying. Prior to switching dryer tower 2 to its adsorption mode, the heater is shut down, thereby allowing recirculating hydrogen to cool the desiccant. This insures that when tower 2 is back on-line, it does not heat the hydrogen and thereby reduce its ability to cool the generator.

During regeneration, the recirculating hydrogen flows through the tower and transports the moisture driven off by the heater. Outlet four-way valve 7 directs the moisture laden hydrogen to the cooler 4. The moisture is condensed in the cooler and separated from the hydrogen in the gas/water separator 5. The water 25 separated from the hydrogen flows out of the gas/water separator and is discharged from the gas dryer through a drain 34. After leaving the gas/water separator, the hydrogen 20 is then recirculated back to dryer tower 2 where it carries away additional moisture driven off by the heating of the desiccant. Thus, whereas in the adsorption mode the desiccant becomes progressively saturated, in the regeneration mode the desiccant becomes progressively dryer.

In the existing system, a moisture sensor 26 is installed to measure the moisture content of the hydrogen 16 entering the dryer A second moisture sensor 27 is installed to measure the moisture content of the hydrogen 19 discharged from the dryer. According to the current invention, a third moisture sensor 28 is added to the system to measure the moisture content of the recirculating hydrogen 20 leaving the gas/water separator 5.

The moisture sensors 26, 27 and 28 may be of the dewpoint type—that is, sensors that determine moisture content by sensing the change in electrical capacitance due to condensation on the surface of a probe that is inserted into the gas stream. An output device 155 on each sensor generates an electrical signal representative of the dewpoint, and hence the moisture content, of the gas.

According to the current invention, a flow meter 29 is also added to the system. The flow meter, which may be of the positive displacement type, is installed to sense the flow of water 25 from the gas/water separator. The flow meter generates an electrical signal representative of the flow rate sensed.

Figure 5:
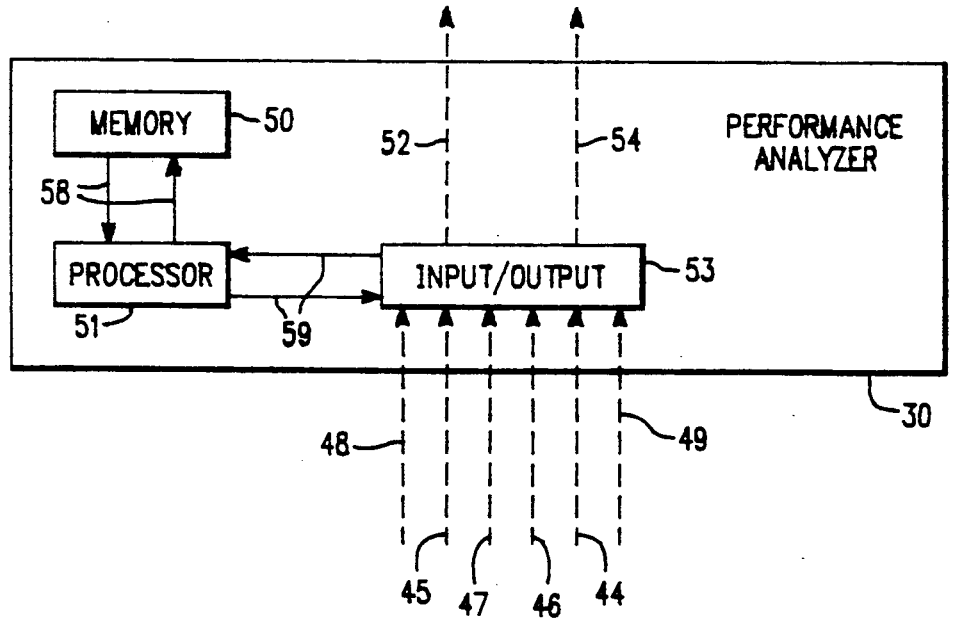
FIG. 5 is a schematic representation of the performance analyzer shown in FIG. 2.

There is also shown in FIGS. 2 and 5 a performance analyzer 30, which may be a microcomputer. As shown in FIG. 5, the performance analyzer incorporates an input/output device 53, a memory device 50 and a processor 51. The input/output device 53 receives the signals from the moisture sensors 26, 27 and 28, the water flow meter 29, and the thermostats 23, 24 (the signals from the thermostats inform the performance analyzer of the temperature of the desiccant). The input/output device converts the electrical signals received into data representation of the moisture content, temperature and water flow sensed. These signals are received via data transmitting wires 44, 45, 46, 47, 48 and 49, respectively, connecting these devices to the performance analyzer. In the preferred embodiment, the performance analyzer performs five functions:

(i) automatic dryer tower switchover
(ii) desiccant heater duration control
(iii) detection of sensor malfunctions
(iv) detection of desiccant problems
(v) detection of water leaks The performance analyzer causes the dryer towers to be switched between their adsorption and regeneration modes by activating (energizing and re-energizing) solenoid valve 33 through input/output device 53 and wire 52. The energizing of the solenoid valve causes the pneumatically actuated inlet and outlet four-way valves to assume their first setting (i.e., entering hydrogen flows through dryer tower 3 and recirculating hydrogen flows through dryer tower 2). The de-energizing of the solenoid valve causes the inlet and outlet valves to assume their second setting (i.e., entering hydrogen flows through dryer tower 2 and recirculating hydrogen flows through dryer tower 3).

When the performance analyzer detects a sensor malfunction, dessicant problem or water leak, it generates an alarm signal through wire 54—a different alarm signal being generated for each condition detected. The alarm signal activates an alarm 31, which may be an annunciator panel. The alarm alerts the operator to the condition—for example through an audible report—and identifies the particular condition detected (i.e., sensor 27 malfunction, desiccant needs replacement, etc.).

A memory device 50 for storing and retrieving data is incorporated into the performance analyzer. Thus, in performing the functions listed above, the performance analyzer has access to prior sensor readings as well as instantaneous readings. In addition to the sensor data, the logic discussed below is also stored in the memory device along with values against which the sensor data can be compared using the stored logic.

The performance analyzer incorporates a processor, such as the central processing unit 51 shown in FIG. 5, which performs the logic functions described below. In addition, the central processing unit includes a totalizer function to compute the cumulative flow sensed by flow meter 29. The performance analyzer initializes the totalizer at the beginning of each cycle—that is, each time the performance analyzer activates solenoid valve 33—so that at the end of the cycle the totalizer contains the cumulative flow from the gas/water separator during the cycle. Prior to initializing the totalizer at the beginning of the next cycle, the performance analyzer stores the cumulative flow value in its memory. The central processing unit also includes a clock function for determining elapsed time since switchover of the dryer towers. Data links 58 and 59 allow data to flow between the memory device 50, central processing unit 51 and input/output device 53, as shown in FIG. 5.

The performance analyzer accomplishes the five functions given above by using the logic discussed in parts A through E below, which compares the performance of the dryer as sensed by the sensors to the expected performance characteristics of the dryer. The logic is programmed and stored into the memory device 50 of the performance analyzer using means well known to those skilled in the art.

A. Dryer Tower Switching Logic

Figure 3:
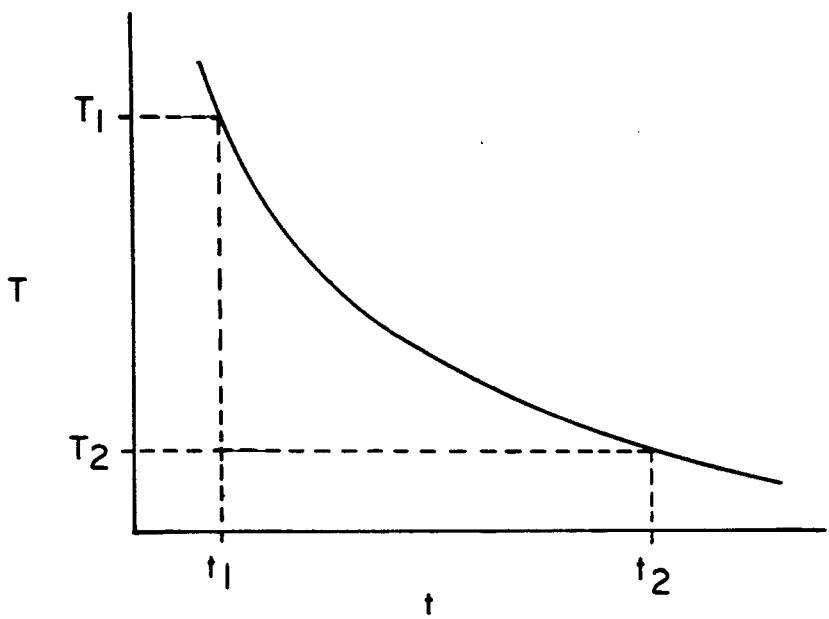
FIG. 3 is a curve showing the relationship between the allowable desiccant adsorption time versus inlet hydrogen gas dewpoint. The ordinant is dewpoint, T, and the abscissa is time, t.

As the adsorption cycle progresses, the ability of the desiccant to adsorb additional moisture decreases. The period of time for which a dryer tower can remain in its adsorption mode and perform satisfactorily depends on the average moisture content of the incoming hydrogen—the greater the moisture content, the shorter the time required to saturate the desiccant. The curve shown in FIG. 2 displays a typical relationship between the allowable adsorption cycle time period, t, and the inlet hydrogen moisture content, expressed as the dewpoint temperature T. As shown in FIG. 3, if the hydrogen dewpoint temperature were $T_1$, the adsorption cycle should not exceed time period $t_1$, whereas if the dewpoint temperature were as low as $T_2$, the adsorption cycle could be as long as time period $t_2$.

As previously explained, unnecessary switching of the dryer towers between their adsorption and regeneration modes is to be avoided. Hence, according to the current invention, the performance analyzer is capable of automatically detecting that the adsorption capacity of the desiccant in the dryer tower in its adsorption mode has decreased to an unacceptable level. In order to maximize cycle time and avoid premature switching, this level may be the point at which the desiccant becomes saturated and can adsorb no further moisture. When this detection occurs, the performance analyzer automatically causes the dryer towers to be switched between their adsorption and regeneration modes if other conditions (described below) are present. The performance analyzer accomplishes the switching by activating solenoid valve 33. As explained above, this results in actuating the inlet and outlet valves, causing them to assume their first or second settings.

Thus, according to the current invention, performance analyzer 30 automatically switches dryer towers whenever all of the conditions in the following set of conditions are present:

(i) the dewpoint sensed by sensor 27 (outlet gas moisture content dpo) is equal to, or greater than, the dewpoint sensed by sensor 26 (inlet gas moisture content dpi), indicating the adsorption capacity of the desiccant in the dryer tower in its adsorption mode has decreased to an unacceptable level (i.e., the desiccant has become saturated and can adsorb no further moisture);

(ii) the dewpoint sensed by sensor 28 (recirculating gas moisture content dpr) is below a predetermined value $K_1$ indicating that the desiccant in the dryer tower in its regeneration cycle has been adequately dried (it has been determined that 20° C. is a suitable value for $K_1$);

(iii) the desiccant temperature T sensed by the thermostat 23, 24 in the tower in its regeneration mode is below a predetermined value $K_2$, indicating that the desiccant has been sufficiently cooled following the drying process;

(iv) no sensor malfunction have been detected (discussed below);

(v) the need for desiccant replacement has not been detected (discussed below).

Note that, for the sake of ease of understanding, reference is made herein to the performance analyzer comparing dewpoints. However, in reality the performance analyzer compares an electrical signal generated by one sensor to that generated by another sensor or to a predetermined signal.

In the preferred embodiment, the performance analyzer automatically switches dryer towers only when all five of the above conditions are satisfied. This approach is consistent with the goal of avoiding unnecessary switchovers. However, if desired, the performance analyzer could be programmed to initiate switchover if the set of conditions comprised only condition (i) or only conditions (i) and (ii), etc.

If the hydrogen is very dry, dryer tower switchover is unnecessary even though the outlet gas moisture content exceeds that of the inlet gas (condition (i) above). Thus, notwithstanding the existence of the conditions discussed above, dryer tower switchover will be inhibited if all of the conditions in the following set of conditions are present:

(vi) the dewpoint sensed by sensor 27 (outlet gas moisture content dpo) does not exceed the dewpoint sensed by sensor 26 (inlet gas moisture content dpi) by more than a predetermined value $K_3$ (it has been determined that 20° C. is a suitable value for $K_3$)

(vii) the cumulative flow sensed by water meter 29 (gas/water separator water flow df) during the previous cycle was more than a predetermined value $K_4$ and less than a predetermined value $K_5$ (it has been determined that 1.0 lbs and 1.75 lbs are suitable values for $K_4$ and $K_5$, respectively);

(viii) the dewpoint sensed by sensor 26 (inlet gas moisture content dpi) is less than a predetermined value $K_6$ (it has been determined that 10° C. is a suitable value for $K_6$).

The logic used to determine that the conditions discussed above are satisfied is shown in FIGS. 6 and 7. In step 60, $K_1$ through $K_6$, discussed above, along with $K_7$ through $K_{25}$, discussed below, are set to their predetermined values, these being stored in the memory device 50. The variable N is used to count the number of cycles and is initially set equal to one. The variable M is used to count the number of times the moisture sensors are read so that average values can be determined and is initially set equal to zero.

Variables $S_1$-$S_5$, $D_1$, $D_2$, W and V are set to zero. Variable V indicates the mode in which the dryer towers are operating, i.e. V=0 means that dryer tower 2 is in its adsorption mode and dryer tower 3 is in its regeneration mode, V=1 means the reverse. Since initial operation is to begin with dryer tower 2 in its adsorption mode, the initial value of V is set equal to zero. Variables $S_1$—$S_5$ indicate whether the sensor malfunction detection logic (see part C) has detected a sensor malfunction—for example, $S_1$=0 means no sensor 29 malfunction has been detected, $S_1$=1 means that a sensor 29 malfunction has been detected. Variables $D_1$ and $D_2$ indicate whether the desiccant problem detection logic (see part D) has detected that there is a desiccant problem ($D_1$=1) or that the desiccant needs replacement ($D_2$=1). Variable W indicates whether the water leak detection logic (see part E) has detected a water leak (W=1).

In step 62, the performance analyzer reads the value of dpi, dpo and dpr, the outputs of sensors 26, 27 and 28, respectively, as received through data transmitting wires 44, 45 and 46. These values are stored in the memory device 50.

Steps 65 and 66 compares dpo to dpi and compares dpr to $K_1$, in order to determine whether conditions (i) and (ii), described above, are satisfied. In step 57 the performance analyzer compares the variable V to zero. If this condition is satisfied—that is, if dryer tower 3 is in its regeneration mode—then in step 68 the performance analyzer reads the value of $T_1$, the temperature sensed by thermostat 23 via data transmitting wire 48, and sets T equal to $T_1$ in step 69. Alternatively, if V is not equal to zero (i.e, V=1)—that is, if dryer tower 2 is in its regeneration mode—then in step 70 the performance analyzer reads the value of $T_2$, the temperature sensed by thermostat 24 via data transmitting wire 49, and sets T equal to $T_2$ in step 71. Thus, the value of T is the temperature of the desiccant in the tower which is in its regeneration mode. Step 72 compares T to $K_2$ in order to determine if condition (iii), discussed above, is satisfied.

In steps 73 and 74, the performance analyzer compares the values of the dummy variables $S_1$-$S_5$, $D_1$ and $D_2$ to zero, in order to determine whether conditions (iv) and (v), discussed above, are satisfied.

In steps 75, 76 and 77, the processor compares dpo to dpi plus $K_3$, compares df from the previous cycle to $K_4$ and $K_5$, and compares dpi to $K_6$, in order to determine whether conditions (vi), (vii) and (viii), discussed above, are satisfied.

Figure 6:
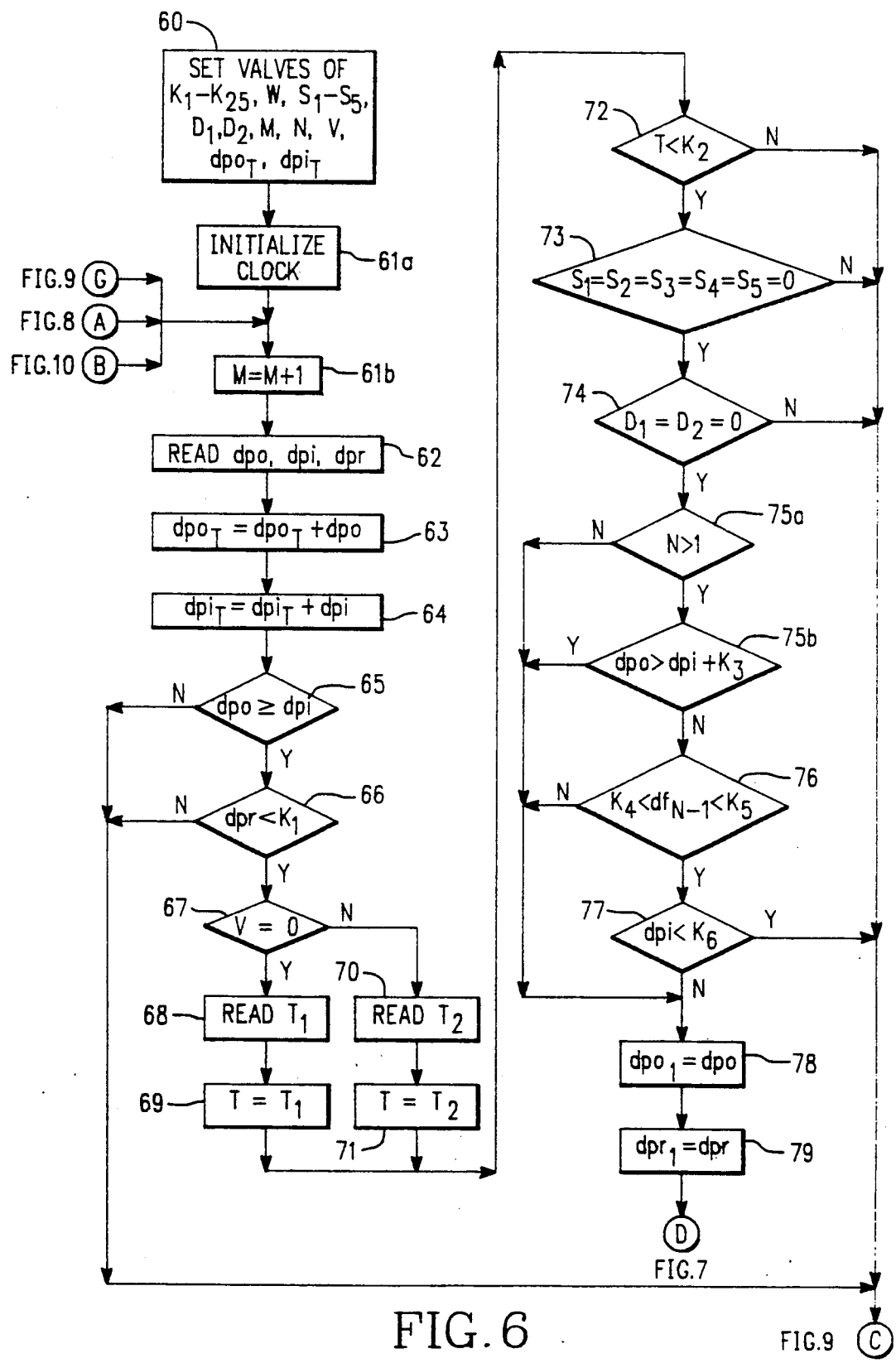
FIGS. 6–10 are flow diagrams of the logic programmed into the microcomputer.
Figure 7:
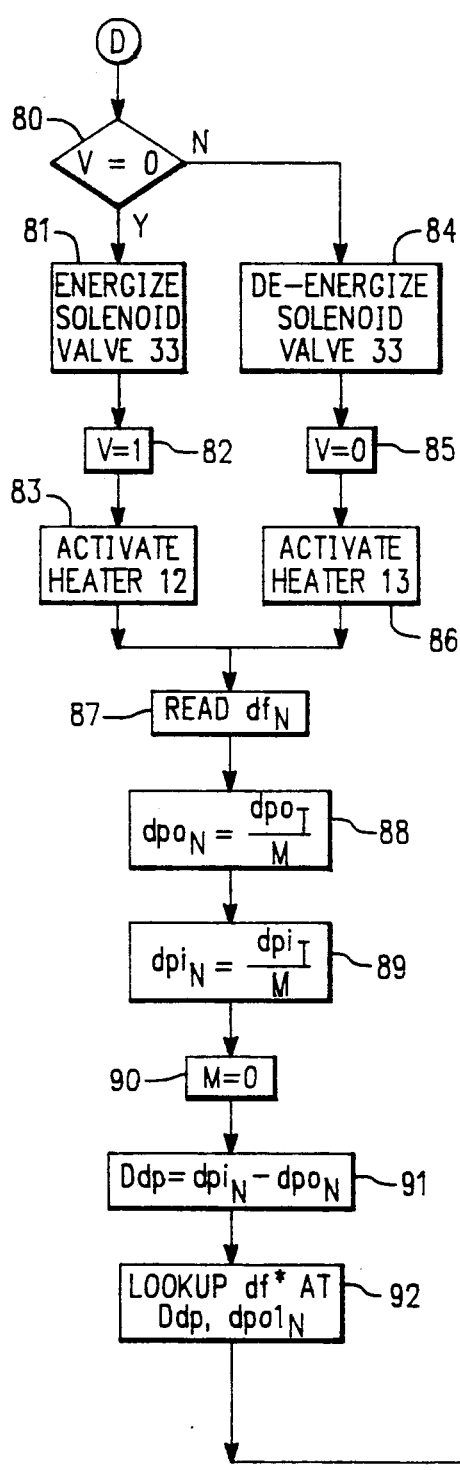
Figure 7:
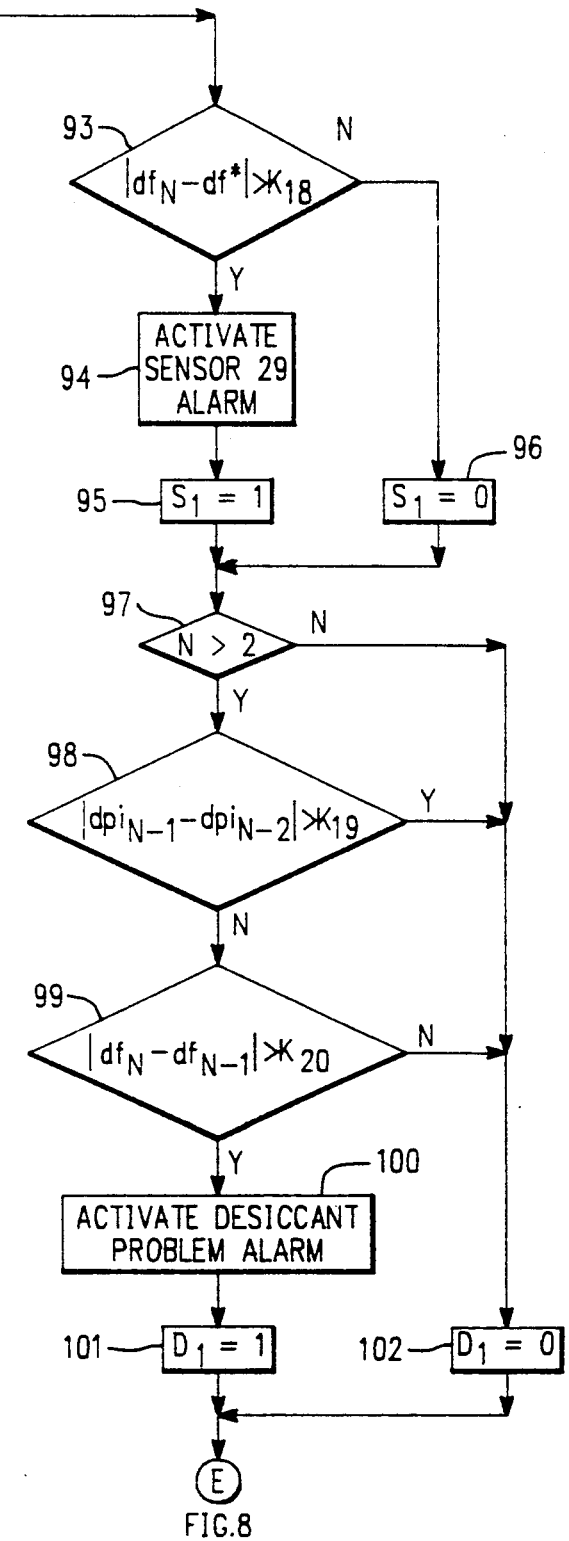

As shown in FIG. 6, if conditions (i), (ii), (iii), (iv) and (v) are all satisfied and if at least one of conditions (vi), (vii) and (viii) are not satisfied, then the performance analyzer initiates switchover of the dryer towers.

In step 80, the performance analyzer determines which dryer tower is in its adsorption mode by comparing V to zero. The microprocessor then places the other dryer tower in its absorption mode.

If V=0, indicating that dryer tower 2 is in its adsorption mode, the performance analyzer will energize solenoid valve 33, via wire 52, in step 81 which, as previously discussed, causes inlet and outlet four-way valves 6 and 7 to assume their first setting, thereby placing dryer tower 3 in its adsorption mode. Variable V is then set to one in step 82, indicating that dryer tower 3 has been placed in its adsorption mode. If V does not equal zero (i.e. V=1), then in step 84 the performance analyzer de-energizes solenoid valve 33, causing the inlet and outlet valves to assume their second setting, thereby placing dryer tower 2 in its absorption mode. In steps 83 and 86, the performance analyzer activates the electric heater 12, 13 of the dryer tower in its regeneration mode.

Using the logic described above will generally result in the cycle time being determined by condition (i)—that is, the time required for the adsorption capacity of the desiccant operating in the adsorption mode to decrease to an unacceptable level. Alternatively, a shorter cycle time could be obtained if switchover were accomplished whenever the adsorption capacity of the desiccant operating in the regeneration mode increased to an acceptable level (regardless of the performance of the dryer tower in its adsorption mode) This level may be the point at which the desiccant is sufficiently dried so that little additional moisture is being driven off by the heater. Thus, the performance analyzer can be programmed to automatically switch dryer towers whenever the dewpoint sensed by sensor 28 (recirculating gas moisture content) is below 20° C., indicating that little additional moisture is being driven off.

B. Desiccant Heater Duration Control Logic

As previously discussed, thermostats 23, 24 attempt to maintain the temperature of the desiccant in the 80°-105° C. range during drying. However, since the flow rate of hydrogen during regeneration varies, it sometimes occurs that the desiccant temperature does not reach the desired temperature range because the hydrogen flow rate is high. Since low desiccant temperature requires longer drying time, the prior art method (fixed cycle time) sometimes resulted in a dryer tower being returned to its adsorption mode prior to complete regeneration. According to the current invention, the performance analyzer varies the heating time—the lower the desiccant temperature, the longer the heating time—based on the desiccant temperature indicated by the thermostat, so as to ensure that complete regeneration is achieved.

Figure 8:
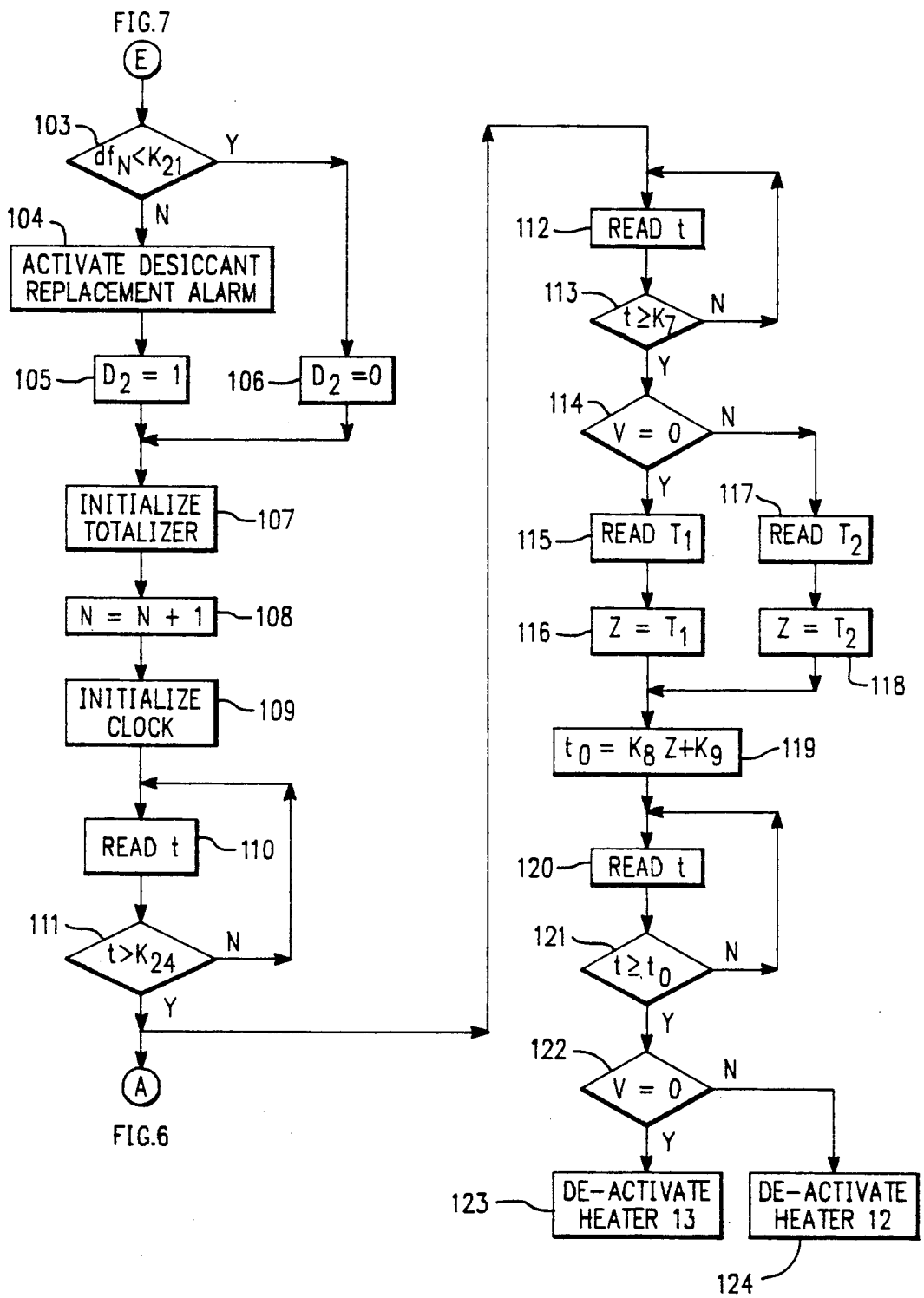

A flow diagram of the desiccant heater control logic is shown in FIG. 8 The processor clock is initialized in step 109. After a period of time $K_{24}$ has elapsed, steps 110 and 111 direct the processor to go through the switchover logic shown in FIG. 6 again. The value of $K_{24}$ is chosen to ensure that the sensor readings have stabilized following switchover before reading them and applying the switchover logic again. In steps 112-118, the processor sets Z equal to the temperature of the desiccant in the dryer tower in its regeneration mode if time $K_7$ has elapsed. The value of $K_7$ is chosen to ensure that the temperature of the desiccant has reached steady state conditions prior to reading its temperature.

In step 119, the desired value for the desiccant heating time period $t_o$ is calculated based on Z and predetermined values $K_8$ and $K_9$. As shown in FIG. 8, step 119 involves calculating $t_o$ as a linear function of Z. However, more complex functions could be utilized if desired.

In steps 120 and 121, the value of the clock time t is read and compared to $t_o$. When the elapsed time equals $t_o$, the microprocessor deactivates the appropriate heater 12, 13 in steps 123 and 124. Note that, until the heater is deactivated, the desiccant temperature in the dryer tower in its regeneration mode will be high and the comparison in step 72 in FIG. 6 will not be satisfied, thus precluding switchover.

C. Sensor Malfunction Detection Logic

As with the dryer tower switching function, the performance analyzer detects a sensor malfunction using logic which compares the dryer performance as sensed by the sensors to the expected performance characteristics of the dryer. Thus, using logic shown in steps 125-127 of FIG. 9, the performance analyzer initiates an inlet moisture sensor (sensor 26) malfunction alarm whenever both of the following conditions are present:
  (i) the dewpoint sensed by sensor 27 (outlet gas moisture content dpo) is equal to, or greater than, the dewpoint sensed by sensor 26 (inlet gas moisture content dpi); and
  (ii) the dewpoint sensed by sensor 26 (dpi) is below a predetermined value $K_{10}$, representing the minimum dewpoint reading obtainable by the moisture sensor. (The value of $K_{10}$ will depend on the particular moisture sensor used but will typically be approximately −50° C.) It has been determined that an inlet dewpoint less than that which can be sensed by a moisture sensor cannot be achieved by the dryer and indicates a sensor malfunction.

The presence or absence of the sensor 26 alarm is indicated in the logic by the value of the processor assigns to $S_2$ in steps 128 and 129.

Figure 9:
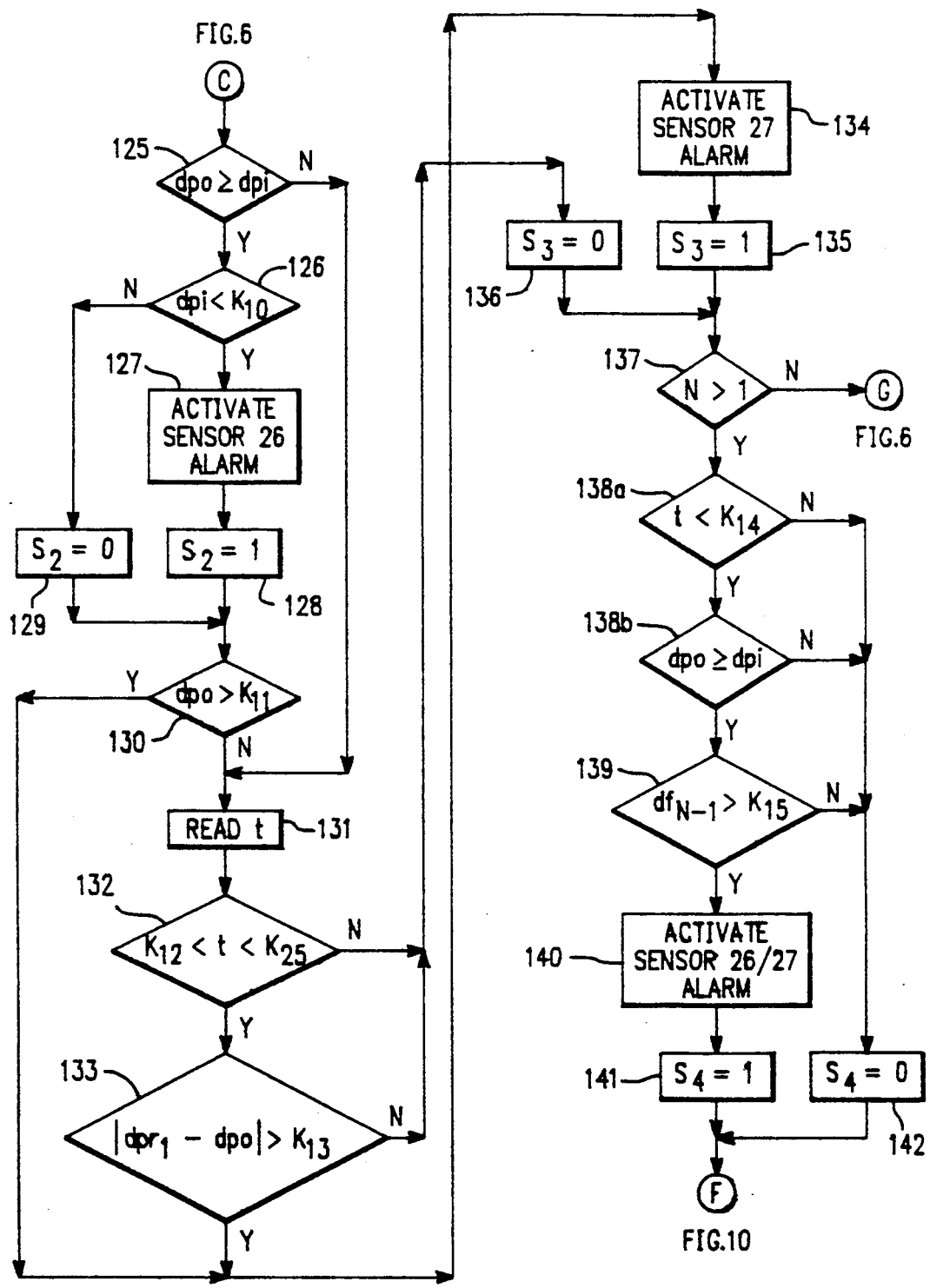

Using the logic shown in steps 125, 130 and 134 of FIG. 9, the performance analyzer initiates an outlet moisture sensor (sensor 27) malfunction alarm whenever both of the following conditions are present;
  (i) the dewpoint sensed by sensor 27 (dpo) is equal to, or greater than, the dewpoint sensed by sensor 26 (dpi);
  (ii) the dewpoint sensed by senor 27 (dpo) exceeds a predetermined value $K_{11}$ representing the maximum dewpoint reading obtainable by the moisture sensor. (The value of $K_{11}$ will also depend on the particular moistures sensor used but will typically be about 50° C.) It has been determined that an outlet gas dewpoint above the maximum reading obtainable from a moisture sensor cannot be expected to occur in practice and indicates a sensor malfunction.

The presence or absence of the sensor 27 alarm is indicated in the logic by the value the processor assigns to $S_3$ in steps 135 and 136.

Note that following dryer tower switchover, hydrogen denoted 20, 21, 22 in FIG. 2, which had previously been recirculating at moisture content sensed by sensor 28, begins discharging from the dryer. This hydrogen flows past sensor 27 after purging the flow path between outlet valve 7 and sensor 27 of the previously discharging hydrogen. Hence, for a period of time following switchover, the moisture content sensed by sensor should approach that previously sensed by sensor 28. Thus, using the logic shown in steps 131-133 of FIG. 9, the performance analyzer also initiates an outlet moisture sensor (sensor 27) malfunction alarm whenever both of the following occur:

(i) the period of time which has elapsed after the performance analyzer has initiated dryer tower switchover is greater than $K_{12}$ and less than $K_{25}$ ($K_{12}$ is the period of time required to purge the portion of the flow path between outlet valve 7 and sensor 27 following switchover, $K_{25}$ is the period of time required for all of the previously recirculating gas to flow over sensor 27);

(ii) the dewpoint sensed by sensor 27 (outlet gas moisture content dpo) deviates from the dewpoint sensed by sensor 28 just prior to switchover (recirculating gas moisture content $dpr_1$) by more than a predetermined value $K_{13}$ (it has been determined that 6° C. is a suitable value for $K_{13}$).

Removal of a significant amount of moisture from the desiccant during regeneration, as demonstrated by a high water flow sensed by flow meter 29, indicates that the desiccant has substantial adsorption capacity If, despite this indication, the outlet gas dewpoint is higher than the inlet gas dewpoint (suggesting a saturated desiccant) during the initial phase of the adsorption cycle, then either sensor 26 or 27 is malfunctioning. Thus, using the logic shown in steps 137-140 of FIG. 9, the performance analyzer initiates an inlet/outlet moisture sensor (moisture sensors 26, 27) malfunction alarm whenever both of the following conditions are present:

(i) the dewpoint sensed by sensor 27 (dpo) is greater than, or equal to, the dewpoint sensed by sensor 26 (dpi) during a predetermined initial portion of the cycle $K_{14}$;

(ii) the cumulative flow sensed by water meter 29 (df) during the previous regeneration cycle was greater than a predetermined value $K_{15}$ (it has been determined that 0.5 lbs is a suitable value for $K_{15}$).

The presence or absence of the sensor 26/27 alarm is indicated in the logic by the value the processor assigns to $S_4$ in steps 141 and 142.

Figure 10:
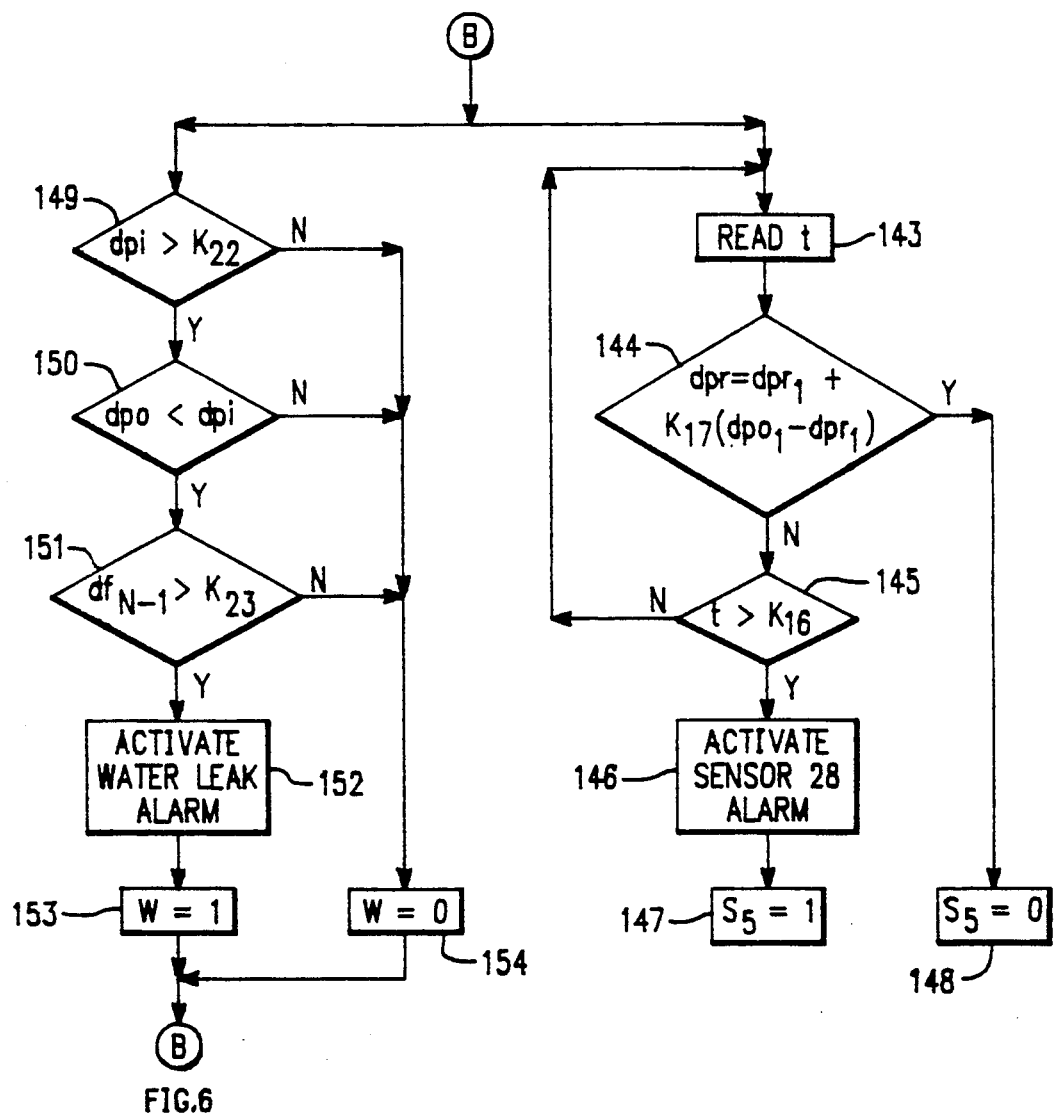

Note that following switchover, hydrogen 18, that had previously been discharging from the dryer at moisture content sensed by sensor 27, enters the recirculating gas flow path. This hydrogen flows over sensor 28 after purging the recirculating gas flow path between outlet valve 7 and sensor 28 of the previously recirculating gas. Eventually, all of the entering hydrogen between inlet valve 6 and outlet valve 7 at the moment switchover occurs will have flowed past sensor 28 and sensor 28 will again begin sensing recirculating hydrogen. Hence, for a period of time following switchover, the moisture content sensed by sensor 28 should approach that sensed by sensor 27 just prior to switchover. Thus, using the logic shown in steps 143-146 of FIG. 10 and the readings of dpo and dpr taken just prior to switchover (designated $dpo_1$ and $dpr_1$) in steps 78 and 79 of FIG. 6, the performance analyzer initiates a recirculating gas moisture sensor (sensor 28) malfunction alarm whenever both of the following conditions occur:

(i) a predetermined period of time $K_{16}$ has elapsed since dryer tower switchover—the duration of the time period is dependent on the time required for all of the entering hydrogen between the inlet and outlet valves at the moment of switchover to flow past sensor 28;

(ii) at no time during the above-mentioned period has the moisture content sensed by sensor 28 (dpr) been equal to that defined by the equation:

$$dpr^* = dpr_1 + K_{17}(dpo_1 - dpr_1)$$

where:
$dpr^*$ = the dewpoint sensed by sensor 28 which must be detected during the period to avoid the alarm;
$dpr_1$, $dpo_1$ = the dewpoints sensed by sensors 28 and 27, respectively, just prior to switchover;
$K_{17}$ = a predetermined fraction based on the responsiveness of the moisture sensors to a short change in dewpoint.

The presence or absence of the sensor 28 alarm is indicated in the logic by the value the processor assigns to $S_5$ in steps 147 and 148.

Figure 4:
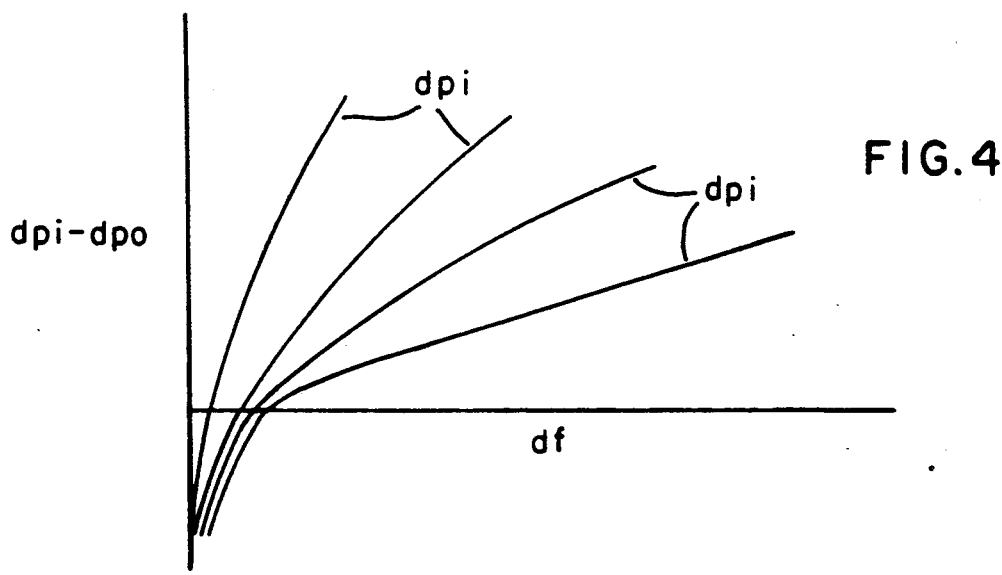
FIG. 4 is a family of curves showing the relationship of the inlet and outlet hydrogen gas dewpoints to the cumulative water flow from the gas/water separator. The ordinant is the differential between the inlet and outlet hydrogen gas dewpoints and the abscissa is the cumulative water flow from the gas/water separator. Each curve represents a different value of the inlet gas dewpoint.

The cumulative water flow from the gas/water separator during a regeneration cycle should equal the moisture adsorbed by the desiccant during the previous adsorption cycle. For any given dryer tower, the moisture adsorbed by the desiccant during an adsorption cycle, and therefore the cumulative water flow during the following regeneration cycle, is a known function of the inlet gas dewpoint and the differential between the inlet and outlet gas dewpoints during the adsorption cycle. A typical relationship is shown in FIG. 4, where dpi and dpo are the inlet and outlet gas dewpoints, respectively, and df is the cumulative water flow from the gas/water separator. Thus, using the logic shown in steps 87-94 of FIG. 7, the performance analyzer initiates a water flow meter (sensor 29) malfunction alarm if, at the end of a cycle, the cumulative water flow of the cycle which just ended deviates more than a predetermined amount $K_{18}$ from the predicted flow $df^*$. The predicted flow is determined in step 92 from information such as that shown in FIG. 4, which is stored in the memory of the performance analyzer, and the average inlet and outlet dewpoints $dpi_n$ and $dpo_n$ sensed during the previous adsorption cycle as determined in steps 88 and 89. The presence or absence of the sensor 29 alarm is indicated in the logic by the value the processor assigns to $S_1$ in steps 95 and 96.

D. Desiccant Problem Detection Logic

If the desiccant in each dryer tower is performing similarly and the inlet gas moisture content is steady throughout two consecutive cycles, then the cumulative water flow from the gas/water separator during the regeneration cycle following each of these cycles should be approximately equal. For example, if tower 2 were in its adsorption mode during cycle 1 (and, therefore, tower 3 in its adsorption mode during cycle 2) and if the inlet moisture content were steady during cycles 1 and 2 and the desiccant in both towers were performing similarly, then at the end of cycle 3 it should be apparent that the cumulative water flow from cycle 2—which is approximately equal to the moisture adsorbed by tower 2 during cycle 1—is close to the cumulative water flow from cycle 3—which is approximately equal to the moisture adsorbed by tower 3 during cycle 2. Thus, using the logic shown in steps 97-100 of FIG. 7, the performance analyzer will initiate a desiccant problem alarm at the end of cycle n if both of the following conditions occur:

(i) the average dewpoint sensed by sensor 26 (inlet gas moisture content dpi) during cycle n−1 did not deviate from the average dewpoint sensed by sensor 26 during cycle n−2 by more than a predetermined amount $K_{19}$;

(ii) the cumulative flow sensed by water meter 29 (df) during cycle n deviates from the cumulative flow during cycle n−1 by more than a predetermined amount $K_{20}$.

Note that if the desiccant is performing satisfactorily, (i.e., it is adsorbing a substantial amount of water during the adsorption cycle) it will release a substantial amount of water during the regeneration cycle. Thus, using the logic shown in steps 103 and 104 of FIG. 8, the performance analyzer will initiate a desiccant replacement alarm if the cumulative water flow sensed by water meter 29 during a complete cycle is less than a predetermined amount $K_{21}$. It has been determined that 0.5 lbs is a suitable value for $K_{21}$.

The presence or absence of the desiccant problem alarm and the desiccant replacement alarm is indicated in the logic by the value the processor assigns to $D_1$ in steps 101 and 102 and to $D_2$ in steps 105 and 106, respectively.

E. Water Leak Detection Logic

If the outlet moisture content is low, even though the inlet moisture content is high, and the water flow from the gas/water separator is high (indicating the desiccant is adsorbing a substantial amount of water), then a water leak in the hydrogen system is probable. Thus, using the logic shown in steps 149-152 of FIG. 10, the performance analyzer initiates a water leak alarm whenever all of the following conditions are present:

(i) the dewpoint sensed by sensor 26 (inlet gas moisture content dpi) is greater than a predetermined value $K_{22}$ (it has been determined that 10° C. is a suitable value for $K_{22}$);

(ii) the dewpoint sensed by sensor 27 (outlet gas moisture content dpo) is less than the dewpoint sensed by sensor 26 (inlet gas moisture content);

(iii) the cumulative flow (df) sensed by water meter 29 during the previous cycle n−1 was greater than a predetermined amount $K_{23}$. (It has been determined that 1.5 lbs is a suitable value for $K_{23}$.)

The presence or absence of the water leak alarm is indicated in the logic by the value the processor assigns to W in steps 153 and 154.

It should be noted that, in light of these teachings, many other functions can be performed by the performance analyzer which similarly relate the measured operating variables to the expected performance parameters. Moreover, although the invention was described as applied to a system for drying hydrogen used to cool an electrical generator, the invention is equally applicable to drying other gases used for other purposes.

We claim:

1. A gas dryer system comprising:
    (a) means for receiving entering gas and means for discharging said gas after drying;
    (b) first and second towers, each of said towers having adsorbing means for adsorbing moisture from said gas, the ability of said adsorbing means to adsorb moisture from said gas decreasing progressively as said moisture is adsorbed;
    (c) first and second gas flow paths, said first gas flow path being a through flow path through one of said towers, said second flow path being a recirculating flow path through the other of said towers;
    (d) means for directing said gas entering said gas dryer system to flow through said first tower and directing said gas which had previously entered said gas dryer system to recirculate through said second tower when said directing means is in a first setting, said directing means having means for directing said gas entering said gas dryer system to flow through said second tower and directing said gas which had previously entered said gas dryer system to recirculate through said first tower when said directing means is in a second setting;
    (e) switching means for switching said directing means between said first and second settings when said switching means is activated;
    (f) first, second and third sensors for sensing the moisture content of said entering, discharging and recirculating gas, respectively, said first and second sensors disposed in said first gas flow path, said third sensor disposed in said second gas flow path; and
    (g) a performance analyzer having means for automatically activating said switching means whenever the following predetermined set of conditions occurs:
        (i) said moisture content sensed by said second sensor is at least as great as said moisture content sensed by said first sensor, and
        (ii) said moisture content sensed by said third sensor is below a predetermined value.

2. The system according to claim 1 wherein said performance analyzer further comprises means for detecting that a malfunction has occurred in any of said first, second or third sensors.

3. The system according to claim 2 wherein said predetermined set of conditions further comprises said sensor malfunction detecting means having not detected a malfunction in any of said first, second or third sensors.

4. The gas dryer system according to claim 1 wherein:
    a) said gas dryer further comprises means for sensing the temperature of said moisture adsorbing means of said first and second towers, respectively; and
    b) said predetermined set of conditions further comprises said temperature of said moisture adsorbing means in said tower through which said directing means is directing said gas to recirculate is below a predetermined temperature.

5. The gas dryer system according to claim 1 further comprising:
    a) means for heating said adsorbing means of said first and second towers, whereby said moisture adsorbed by said adsorbing means is released;
    b) a fourth sensor for sensing the temperature of said adsorbing means of said first and second towers; and c) wherein said performance analyzer further comprises:
  (i) means for activating said heating means, and
  (ii) means for varying the length of time said heating means is activated based upon said temperature sensed by said fourth sensor.

6. A gas dryer system, into which gas enters, from which said gas discharges and within which said gas recirculates, comprising:
  (a) a gas flow path, said gas flow path having means for adsorbing moisture from said gas when operating in an adsorption mode, said gas flow path having means for releasing moisture previously adsorbed by said adsorbing means into said recirculating gas when operating in a regeneration mode;
  (b) means for switching said gas flow path between operating in said adsorption mode and operating in said regeneration mode when said switching means is activated;
  (c) means for condensing said moisture released into said recirculating gas;
  (d) means for discharging said condensed moisture from said gas dryer system; and
  (e) a flow meter for sensing the flow rate of said condensed moisture discharged from said dryer system, said flow meter having means for generating an electrical signal representative of said flow rate sensed;
  (f) an alarm for indicating that said adsorbing means should be replaced when said alarm is activated; and
  (g) a performance analyzer, said performance analyzer having:
    (i) means for receiving said signal generated by said flow meter,
    (ii) means for determining the cumulative flow sensed by said flow meter between successive activations of said switching means, and
    (iii) means for activating said alarm whenever said cumulative flow is less than a predetermined value.

7. A gas dryer system, into which a gas enters and from which said gas discharges, comprising:
  (a) a gas flow path, said gas flow path having means for adsorbing moisture from said gas when operating in an adsorption mode, said gas flow path having means for removing moisture previously adsorbed by said adsorbing means when operating in a regeneration mode;
  (b) means for switching said gas flow path between operating in said adsorption mode and operating in said regeneration mode;
  (c) first sensing means for sensing the moisture content of said entering gas;
  (d) second sensing means for sensing the moisture content of said discharging gas;
  (e) third sensing means for sensing the flow rate of said moisture removed;
  (f) means for detecting that water has entered into said entering gas, said detecting means having:
    (i) means for comparing said moisture content sensed by said first sensing means to a first predetermined value;
    (ii) means for comparing said moisture content sensed by said first sensing means to said moisture content sensed by said second sensing means;
    (iii) means for determining the cumulative flow sensed by said third sensing means between two successive switches of said gas flow path between said adsorption and said regeneration modes; and
    (iv) means for comparing said cumulative flow to a second predetermined value.

8. A gas dryer system comprising:
  a) means for receiving a gas and means for discharging said gas received;
  b) a gas flow path in gas flow communication with said gas receiving means, said gas flow path having:
    (i) first and second means for adsorbing moisture from said gas when operating in an adsorption mode, said first and second moisture adsorbing means having means for releasing said moisture adsorbed when operating in a regeneration mode, the ability of said first and second adsorbing means to adsorb moisture decreasing progressively as said moisture is adsorbed,
    (ii) means for recirculating gas through said first and second adsorbing means when said adsorbing means is in said regeneration mode, and
    (iii) means for switching said first and second adsorbing means between operating in said adsorption mode and operating in said regeneration mode when said switching means is activated; and
  c) first, second and third sensors for sensing the moisture content of said gas received by said receiving means, discharged by said discharging means and recirculating through said recirculating means, respectively, said first, second and third sensors having means for generating an electrical signal representative of said moisture content sensed; and
  d) a performance analyzer having:
    (i) means for receiving said electrical signal generated by said sensors,
    (ii) means for detecting that said ability of said first and second adsorbing means to adsorb moisture has reached a predetermined level by comparing said signal generated by said first sensor to said signal generated by said second sensor, and
    (iii) means for activating said switching means when both (a) said detecting means has detected that said ability of said adsorbing means to adsorb moisture has reached a predetermined level and (b) said signal generated by said third sensor indicates that said moisture content of said recirculating gas is below a predetermined level.

9. The gas dryer system according to claim 8 wherein said signal receiving means comprises an input/output device, said input/output device having means for receiving said electrical signals generated by said first, second and third sensors, said input/output device having means for converting said signals received from said first, second and third sensors into data representative of said moisture content sensed.

10. The gas dryer system according to claim 9 wherein said adsorption ability detecting means comprises means for performing a first group of logic steps for comparing said data representative of said moisture content sensed by said first sensor to said data representative of said moisture content sensed by said second sensor.

11. The gas dryer system according to claim 10 wherein said means for performing said first group of logic steps comprises a processor.

12. The gas dryer system according to claim 11 wherein said performance analyzer further comprises:
   (a) a memory device in which said first group of logic steps and said data are stored, and
   (b) means for communicating said data between said processor an said memory device and between said processor and said input/output device.

13. The gas dryer system according to claim 12 wherein said performance analyzer further comprises means for detecting a malfunction in either of said first or second sensors.

14. The gas dryer system according to claim 13 wherein said sensor malfunction detection means comprises means for performing a second group of logic steps for comparing said data representation of said moisture content sensed by said first and second sensors to each other and to first and second predetermined values, respectively.

15. The gas dryer system according to claim 14 wherein said gas dryer further comprises an alarm, said performance analyzer having means for activating said alarm when a sensor malfunction is detected by said sensor malfunction detection means.

* * * * *